United States Patent [19]

Heitmann et al.

[11] Patent Number: 4,765,766

[45] Date of Patent: Aug. 23, 1988

[54] ADJUSTABLE HANDLE FOR APPLICATOR

[75] Inventors: Kenneth Heitmann; Goeffrey B. Rench, both of Racine, Wis.

[73] Assignee: Racine Industries, Inc., Racine, Wis.

[21] Appl. No.: 48,640

[22] Filed: May 11, 1987

[51] Int. Cl.[4] ...................... A46B 11/00; A46B 17/02; B43K 23/02; B62B 1/00

[52] U.S. Cl. ...................................... 401/48; 401/131; 403/59; 403/80; 248/286; 16/111 A; 16/115; 280/655; 15/143 B; 15/144 R

[58] Field of Search ................. 401/48, 131; 15/22 R, 15/23, 143 R, 143 A, 143 B, 144 R, 144 B, 144 A; 403/59, 80; 248/286, 291, 314; 280/47.37, 654, 655, DIG. 6; 222/169, 174; 256/59; 16/110 R, 110.5, 111 R, 111 A, 112, 115

[56] References Cited

U.S. PATENT DOCUMENTS

| | | | |
|---|---|---|---|
| 991,790 | 5/1911 | Lampke | 222/169 |
| 1,429,940 | 9/1922 | Field | 403/59 X |
| 1,908,136 | 5/1933 | Fox | 248/286 X |
| 2,216,026 | 9/1940 | Smith | 15/144 R |
| 2,687,895 | 8/1954 | Rutledge | 280/DIG. 6 X |
| 2,809,490 | 10/1957 | Oeters | 16/111 A X |
| 2,932,047 | 4/1960 | Johnston | 15/143 B |
| 2,938,734 | 5/1960 | Guimond | 280/47.37 R X |
| 3,035,847 | 5/1962 | Born | 280/654 |
| 3,347,575 | 10/1967 | Morris | 16/115 X |
| 3,463,457 | 8/1969 | Alexander | 256/59 |
| 3,762,737 | 10/1973 | Good | 280/DIG. 6 X |
| 4,368,997 | 1/1983 | Shemtov | 403/59 |
| 4,478,429 | 10/1984 | Adams | 280/47.37 R X |
| 4,657,100 | 4/1987 | Lewis | 280/655 X |

*Primary Examiner*—Richard J. Apley
*Assistant Examiner*—David J. Bender
*Attorney, Agent, or Firm*—Peter N. Jansson, Ltd.

[57] ABSTRACT

An applicator for particulate compositions having a horizontally oriented apertured dispensing container, wheels on either side, and an improved upright handle apparatus. The handle apparatus includes a yoke with a cross member, a mounting bracket affixed to the cross member, a pivotably attached slide mount which is preferably a support tube, a slidably mounted elongated handle, and lock members on the mount and handle for selectively securing the handle member in the slide mount in either an upright use position or a horizontal carrying/storage position. The lock members are preferably spring-loaded button members with buttons receivable in a lateral opening in the support tube. A socket in the bracket base provides rigid connection of the handle member to the cross member.

14 Claims, 2 Drawing Sheets

ADJUSTABLE HANDLE FOR APPLICATOR

FIELD OF THE INVENTION

This invention is related generally to applicators for particulate compositions and, more specifically, to adjustable handles of applicators for applying particulate compositions in dry extraction carpet cleaning.

BACKGROUND OF THE INVENTION

Many different kinds of applicators have been developed for applying particulate compositions. One common type has a horizontally oriented apertured dispensing container, wheels on either side thereof for rolling across a horizontal surface, and an upright handle apparatus for pushing the applicator.

Such devices are often difficult to load in a vehicle which is loaded with other paraphernalia, primarily because of their size and because of the location and length of their handles. For that reason, various removable and/or adjustable handle mechanisms have been developed.

Some of such mechanisms are difficult to remove or adjust and rather complex in construction. Furthermore, many such handles serve little purpose when not in their upright position as necessary for the spreading of particulate compositions.

It is particularly important for professional carpet cleaners who perform dry extraction carpet cleaning that the applicators they use be easily portable between jobs and quickly adjusted for use or for carrying and storage. There is a need for an improved applicator for particulate carpet-cleaning compositions having an improved adjustable handle apparatus.

OBJECTS OF THE INVENTION

It is an object of this invention to provide an applicator for particulate compositions having an improved adjustable handle apparatus overcoming some of the problems and shortcomings of devices of the prior art.

Another object of this invention is to provide an improved applicator for use by carpet cleaning professionals who utilize dry extraction carpet cleaning methods.

Another object of this invention is to provide an improved applicator for particulate compositions which is simple in construction and quickly and easily adjusted from an upright use to a carrying/storage position.

Another object of this invention is to provide an improved handle apparatus for particulate composition applicators which makes such applicators compact in a carrying/storage form such that they may easily be loaded into a crowded vehicle.

Another object of this invention is to provide an improved applicator having an upright handle member which also serves as a convenient handle for carrying the applicator to or from a job.

These and other important objects will be apparent from the descriptions which follow.

SUMMARY OF THE INVENTION

This invention is an improved applicator for particulate carpet-cleaning compositions having an improved handle member overcoming some of the problems and disadvantages of the prior art. The applicator is of the type having a horizontally oriented apertured dispensing container with wheels on either side and an upright handle apparatus for pushing the applicator.

The improved handle apparatus includes a yoke having legs adjacent to each of the wheels and a cross member interconnecting the legs, a mounting bracket affixed with respect to the cross member, a slide mount pivotably attached to the bracket, an elongated handle member extending slidably and adjustably through the mount, and means on the mount and handle for selectively securing the handle in the slide mount in either an upright use position or in a substantially horizontal carrying/storage position.

In preferred embodiments, the slide mount is a sturdy support tube and the selective securing means includes a lateral opening in the support tube. The selective securing means also includes upper and lower lock members attached in spaced positions to the handle member and engagable with the lateral opening.

The lock members are preferably spring-loaded button members having buttons receivable within the lateral opening in the support tube and depressible for disengagement from the lateral opening. The handle is preferably a tube which receives the button members internally in fixed positions and has orifices from which the buttons extend.

In certain highly preferred embodiments, there is a means along the cross member for engaging the lower end of the handle when the handle is in its upright use position, in order to provide more rigid connection of the handle member to the cross member. The mounting bracket preferably has a pair of opposed bracket walls, to and between which the slide mount is pivoted, and a bracket base along the cross member which has the means for engaging the lower end of the handle.

In the most preferred form, the bracket base has an end-receiving socket formed in it in axial alignment with the support tube. The lateral opening in the support tube, the lower lock member, and the bracket are positioned and arranged such that the lower end of the elongated handle member is held in the socket by engagement of the lower lock member with the lateral opening of the support tube.

In highly preferred embodiments, the elongated handle member is L-shaped, having a main portion and a shorter hand grip portion. This configuration is such that in the horizontal carrying/storage position the main portion is horizontal and extends along the cross member and the hand grip portion extends downwardly adjacent to one of the wheels.

The mounting bracket is preferably affixed to the cross member in an off-center position with respect to the axial length of the dispensing container. This configuration, together with the L-shaped elongated member, allows the hand grip portion to be immediately adjacent to the wheel. It also allows the main portion of the elongated handle member to serve most efficiently as a handle, because it can be gripped at a center position with respect to the applicator without interference from the bracket.

DETAILED DESCRIPTION OF PREFERRED EMBODIMENTS

Figure 1:
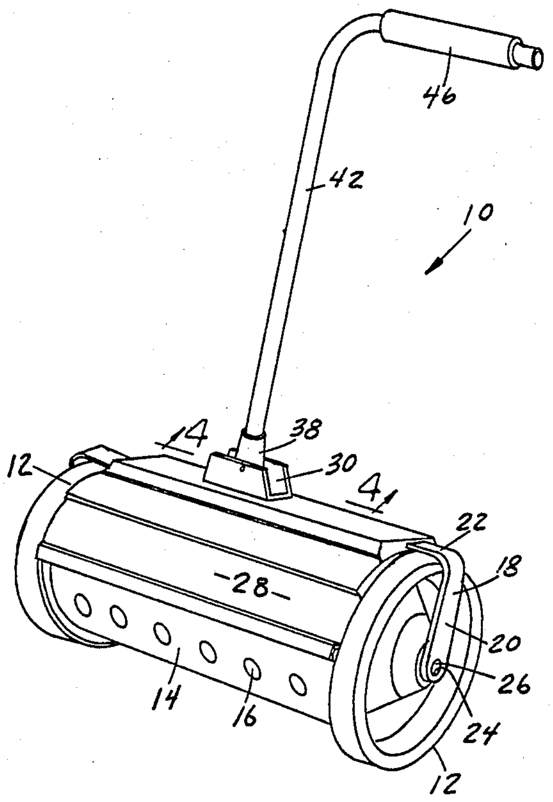
FIG. 1 is a perspective view of the applicator of this invention with its handle in the upright use position.

The drawings illustrate an applicator 10 for a particulate composition, such as a particulate carpet-cleaning composition, having an improved handle apparatus in accordance with a preferred embodiment of this invention. Applicator 10 is of the type with wheels 12 on either side of a dispensing container 14 which has apertures 16 for dispensing the particulate composition as it rotates, typically by the force of gravity.

Applicator 10 includes a yoke 18 which forms part of the handle apparatus to which dispensing container 14 is attached. Yoke 18 includes a pair of legs 20 and a cross member 22. Openings 24 at the ends of the legs 20 receive spindles 26 which extend axially from the ends of wheels 12. By this structure, dispensing container 14 turns freely with respect to yoke 18.

A hood 28, which serves to shield much of dispensing container 14 from view and also provides a handy surface for application of instructional information and the like, is attached to cross member 22. A mounting bracket 30 has a bracket base 32 attached to cross member 22 by means of screws 34, thus sandwiching hood 28 against cross member 22. Mounting bracket 30 also includes opposed bracket walls 36.

A support tube 38 is between bracket walls 36 and is attached pivotably to each of walls 36 by means of pivot mounting screws 40. Support tube 38 provides a slide mount for elongated shaft 42 and, by virtue of its pivotability, allows elongated shaft 42 to assume different positions with respect to cross member 22 and dispensing container 14.

Elongated shaft 42 is an L-shaped member having a main portion 44, which is slidably mounted in support tube 38 and terminates downwardly in a lower end 50, and a handle grip portion 46, which is much shorter in length than main portion 44. Elongated shaft 42 is a hollow tube.

Figure 4:
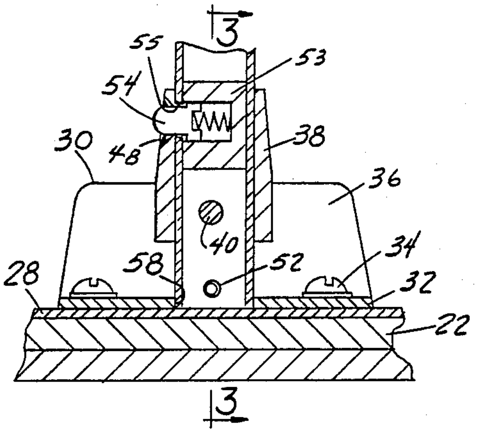
FIG. 4 is an enlarged fragmentary sectional view taken along section 4—4 as indicated in FIG. 1.
Figure 5:
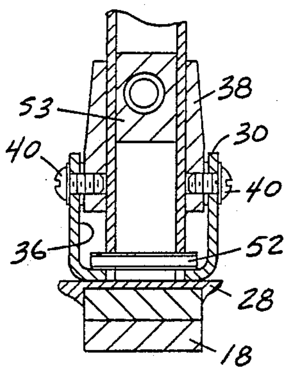
FIG. 5 is an enlarged sectional view taken along section 5—5 as indicated in FIG. 4.
Figure 6:
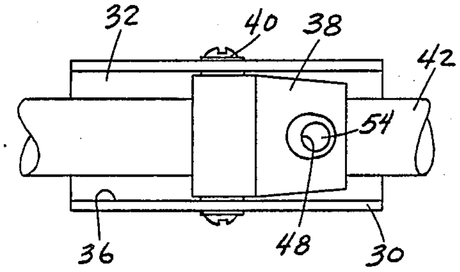
FIG. 6 is an enlarged fragmentary top plan view of FIG. 2.
Figure 3:
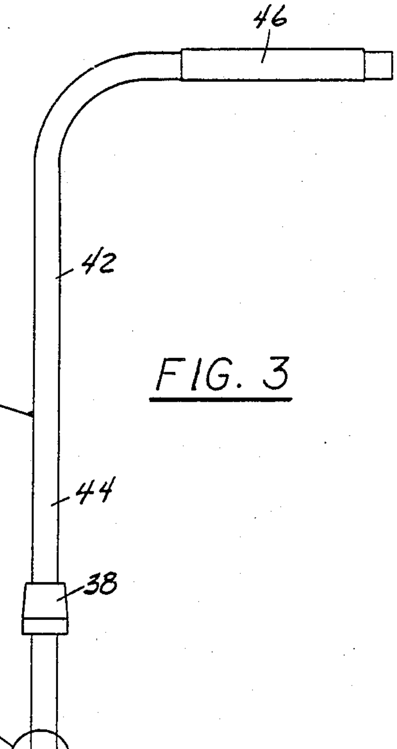
FIG. 3 is an enlarged enlarged front elevation of the handle.
Figure 3:
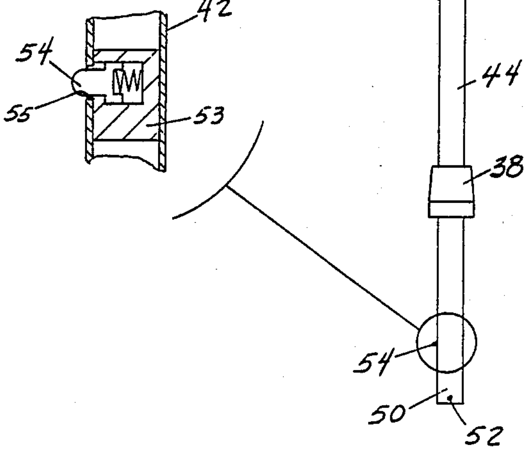

As illustrated best in FIGS. 4 and 6, support tube 38 has a beveled lateral opening 48 which extends in a radial direction with respect to the axis of support tube 38. As illustrated best in FIGS. 3, 4 and 5, a spring-loaded button member 53, which is held within elongated shaft 42, forms a lower lock member near lower end 50 of elongated shaft 42. Such lower lock member provides a lower button 54 which extends through an opening 55 in elongated shaft 42, is biased outwardly, and is receivable within lateral opening 48 in support tube 38.

Figure 2:
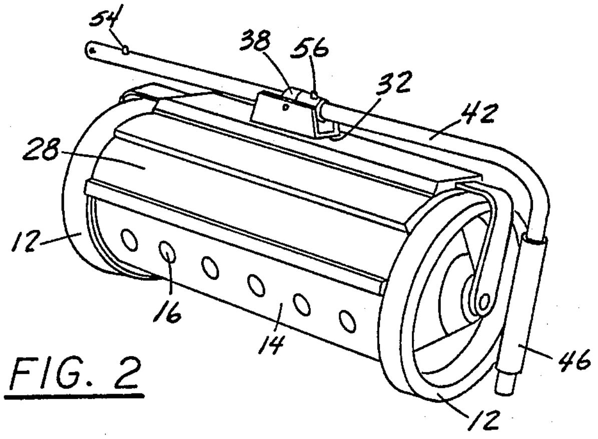
FIG. 2 is a perspective illustrating the applicator of this invention with its handle in the carrying/storage position.

Another button member, identical to button member 53, is held within elongated shaft 42 at a position spaced from lower end 50 and lower button 54, and provides an upper lock member with an upper lock button 56. Lower and upper lock buttons 54 and 56 and lateral opening 48 in support tube 38 together form means for selectively securing elongated shaft (or handle member) 42 in support tube 38 in either an upright use position or a substantially horizontal carrying/storage position. The upright us position is illustrated in FIG. 1 and the carrying/storage position is illustrated in FIG. 2.

By simply depressing button 54 or 56, whichever is engaged with lateral opening 48, elongated shaft 42 may be released within support tube 38 such that elongated shaft 42 can be slid from one position to the other. When button 54 or 56 is against the end of support tube 38, it may be depressed so that it will pass under tube 38 and engage lateral opening 48.

As illustrated in FIGS. 4 and 5, bracket base 32 has an opening 58 which forms a socket to receive lower end 50 of shaft 42 when shaft 42 is in its upright use position. Lower end 50 is held within opening 58 by means of the relative positioning of lower button 52 and lateral opening 48. That is, lower button 54 snaps into place in lateral opening 48 when lower end 50 is fully inserted in opening 58, and must be depressed and disengaged from lateral opening 48 to allow elongated shaft 42 to slide out of engagement with opening 58. This arrangement provides rigid connection of elongated shaft 42 to cross member 22.

A stop pin 52, preferably a roll pin, extends through elongated shaft 42 near the end of lower end 50. Stop pin 52 prevents the complete disengagement of elongated shaft 42 from support tube 38.

The L-shaped configuration of elongated shaft 42 is such that in the carrying/storage position main portion 44 is horizontal, extending along cross member 22, and handle grip portion 46 extends downwardly adjacent to one of the wheels 12. Mounting bracket 30 is preferably affixed to cross member 32 in an off-center position. Such off-center positioning and the positioning of upper lock button 56 along elongated shaft 42 places hand grip portion 46 immediately adjacent to the wheel when the handle member is in the carrying/storage position. This allows the applicator of this invention to be compact for easy carrying and storage.

A further advantage of the off-center mounting of mounting bracket 30 is that it allows main portion 44 of shaft 42 to serve as a hand grip along the middle of applicator 10, such that applicator 10 can easily be carried.

The applicator and improved handle apparatus of this invention may be made using readily available materials and parts which are well-known to those skilled in the art. Yoke 18, mounting bracket 30, support tube 38, elongated shaft 42 and the various pins and connectors are preferably made of metal.

While the principles of this invention have been described in connection with specific embodiments, it should be understood clearly that these descriptions are made only by way of example and are not intended to limit the scope of the invention.

What is claimed is:

1. In an applicator for particulate compositions of the type having a horizontally oriented apertured dispensing container, wheels on either side thereof forming a container axis, and an upright handle apparatus for pushing the applicator, the improvement in the handle apparatus comprising:

a yoke having legs adjacent to each of the wheels and a cross member interconnecting the legs and extending in a direction substantially parallel to the container axis;

a mounting bracket affixed with respect to the cross member;

a slide mount attached to the bracket and freely pivotable with respect thereto about a mount axis;

an elongated handle member slidably mounted in the mount, the handle member having a lower end; and means at least at the lower end of the handle member and at a generally middle position spaced therefrom for selectively securing the handle member in the slide mount in an upright position and in a substantially horizontal position, said mount axis being perpendicular with respect to the plane formed by the container axis and cross member, whereby, in addition to functioning as an upright handle, the handle can readily be adjusted to a horizontal position parallel to the container axis and cross member and closely adjacent thereto so that it can function as a convenient carrying handle for the container and its contents.

2. The applicator of claim 1 wherein the slide mount is a support tube, the elongated handle member slidably extending therethrough.

3. The applicator of claim 2 wherein the selective securing means comprises:

the support tube defining a lateral opening; and upper and lower lock members attached in spaced positions to the handle member and engagable with the lateral opening.

4. The applicator of claim 3 wherein the lock members are spring-loaded button members having buttons receivable within the lateral opening and depressible for disengagement from the lateral opening.

5. The applicator of claim 4 wherein the handle member is a tube receiving the button members internally and having orifices from which the buttons extend.

6. The applicator of claim 1 wherein the elongated handle member is L-shaped having a main portion and a shorter hand g ip portion such that in the horizontal carrying/storage position the main portion is horizontal and extends along the cross member and the hand grip portion extends downwardly adjacent to one of the wheels.

7. The applicator of claim 6 wherein the mounting bracket is affixed to the cross member in an off-center position and the upper lock member is positioned such that the hand grip portion is immediately adjacent to said one wheel in the carrying/storage position, whereby in such position the applicator is compact for easy carrying and storage.

8. In an applicator for particulate compositions of the type having a horizontally oriented apertured dispensing container, wheels on either side thereof, and an upright handle apparatus for pushing the applicator, the improvement in the handle apparatus comprising:

a yoke having legs adjacent to each of the wheels and a cross member interconnecting the legs;

a mounting bracket affixed with respect to the cross member;

a support tube pivotably attached to the bracket, the support tube having a lateral opening;

an elongated handle member slidably extending through the support tube, the handle member having a lower end;

upper and lower lock members attached in spaced positions to the handle member and engageable with the lateral opening whereby the handle member may be selectively secured in the support tube in an upright use position and a substantially horizontal carrying/storage position; and means along the cross member for engaging the lower end of the handle member when the handle member is in its upright use position, thereby providing rigid connection of the handle member to the cross member.

9. The applicator of claim 8 wherein the mounting bracket comprises:

a pair of opposed bracket walls, to and between which the slide mount is pivoted; and a bracket base along the cross member, the bracket base having thereon the means for engaging the lower end of the elongated handle member.

10. The applicator of claim 9 wherein the engagement means on the bracket base is an end-receiving socket formed in the bracket base in axial alignment with the support tube, the lateral opening, lower lock member and bracket positioned and arranged such that the lower end of the elongated handle member is held in the socket by engagement of the the lower lock member with the lateral opening of the support tube.

11. The applicator of claim 10 wherein the lock members are spring-loaded button members having buttons receivable within the lateral opening and depressible for disengagement from the lateral opening.

12. The applicator of claim 11 wherein the handle member is a tube receiving the button members internally and having orifices from which the buttons extend.

13. The applicator of claim 12 wherein the elongated handle member is L-shaped having a main portion and a shorter hand grip portion such that in the horizontal carrying/storage position the main portion is horizontal and extends along the cross member and the hand grip portion extends downwardly adjacent to one of the wheels.

14. The applicator of claim 13 wherein the mounting bracket is affixed to the cross member in an off-center position and the upper lock member is positioned such that the hand grip portion is immediately adjacent to said one wheel in the carrying/storage position, whereby in such position the applicator is compact for easy carrying and storage.

* * * * *

UNITED STATES PATENT AND TRADEMARK OFFICE

CERTIFICATE OF CORRECTION

PATENT NO. : 4,765,766

DATED : August 23, 1988

INVENTOR(S) : Kenneth Heitmann and Geoffrey B. Rench

It is certified that error appears in the above-identified patent and that said Letters Patent is hereby corrected as shown below:

On the first page where the inventors are listed, delete "Goeffrey" and insert --Geoffrey--.

In column 3, line 1, delete "an" and insert --a further--.

In column 3, line 67, delete "us" and insert --use--.

In column 5, line 33, delete "g ip" and insert --grip--.

In column 6, line 30, delete the second "the".

Signed and Sealed this

Tenth Day of January, 1989

*Attest:*

DONALD J. QUIGG

*Attesting Officer*

*Commissioner of Patents and Trademarks*